United States Patent [19]
Sonoda

[11] Patent Number: 6,121,530
[45] Date of Patent: Sep. 19, 2000

[54] WORLD WIDE WEB-BASED MELODY RETRIEVAL SYSTEM WITH THRESHOLDS DETERMINED BY USING DISTRIBUTION OF PITCH AND SPAN OF NOTES

[76] Inventor: Tomonari Sonoda, Room 107, 10-30, Takadanobaba 1-chome, Shinjuku-ku, Tokyo, Japan

[21] Appl. No.: 09/272,211

[22] Filed: Mar. 19, 1999

[30] Foreign Application Priority Data

Mar. 19, 1998 [JP] Japan .................................. 10-111273
Dec. 21, 1998 [JP] Japan .................................. 10-378084

[51] Int. Cl.[7] .................................................. G10H 7/00
[52] U.S. Cl. ............................... 84/609; 84/610; 84/649; 84/650
[58] Field of Search ................. 84/601–607, 609–613, 84/622–625, 645, 649–652; 348/7, 12–14; 395/200.31, 200.33, 200.47, 200.49

[56] References Cited

U.S. PATENT DOCUMENTS 5,732,216  3/1998  Logan et al. ................. 395/200.33

FOREIGN PATENT DOCUMENTS 4-13200   1/1992  Japan .
8-305380  11/1996 Japan .

*Primary Examiner*—Paul Ip
*Assistant Examiner*—Marlon T. Fletcher
*Attorney, Agent, or Firm*—Wenderoth, Lind & Ponack, L.L.P.

[57] ABSTRACT

A World Wide Web-based melody retrieval system takes a sung melody as a query and retrieves the song's title or other information from a music database over a WWW network which comprises a method of obtaining search clues with the maximum quantity of information from pitch and span (dynamic threshold determination) and a method of effectively reducing the number of answer candidates (coarse-to-fine matching), thus increasing the matching accuracy, and it is characterized in that a user can retrieve music or media with music by singing.

4 Claims, 3 Drawing Sheets

WORLD WIDE WEB-BASED MELODY RETRIEVAL SYSTEM WITH THRESHOLDS DETERMINED BY USING DISTRIBUTION OF PITCH AND SPAN OF NOTES

BACKGROUND OF THE INVENTION

1. Field of the Invention

This invention relates to a World Wide Web-based melody retrieval system, and more particularly to a World Wide Web-based melody retrieval system with thresholds determined by using distribution of pitch and span of notes from a music database.

2. Description of the Prior Art

It should be understood that the problem in building a melody retrieval system is that an input melody includes various errors which are caused by the uncertainty of the user's memory or by the user's singing ability. Those errors are usually tolerated by using several thresholds and converting the input melody into approximate relative-value sequences of pitch change (the pitch difference between adjacent notes) and of span change (the inter-onset interval ratio of adjacent notes).

For instance, an approximate relative-pitch value is expressed by using three characters (U(p), D(own), and E(qual)), and the sequence "do-re-mi-mi-re-do" is converted into "X-U-U-E-D-D-" (wherein "X" indicates the first not which does not have a relative value). These approximate sequences are then utilized in the matching process which compares the input with all songs in a database.

Prior melody retrieval systems [Kageyama et al. 1993; Ghias et al. 1995] utilized the static heu-ristic thresholds to obtain these approximate sequences. Since it is difficult to determine the optimum thresholds for all songs, those systems did not take advantage of the span information which can potentially be useful, and mainly used pitch information as a search clue.

It was therefore difficult to improve the matching accuracy by using only the pitch information.

It was also difficult to reduce the number of answer candidates because several songs in the large database tended to have the same patterns of the approximate relative-values of pitch and span sequences.

Moreover, the public use of music database over the network has not been considered.

In the conventional music retrieval systems, the pitch information is mainly used as a search clue while the span information is not used effectively, and it is difficult to improve the matching accuracy by using only the pitch information.

SUMMARY AND OBJECTS OF THE INVENTION

A principal object of this invention is to provide a World Wide Web-based melody retrieval system on which a user can input a melody by singing.

Another object of this invention is to provide a World Wide Web-based melody retrieval system with thresholds determined by using distribution of pitch and span of notes from a music database accurately.

Another object of this invention is to provide a World Wide Web-based melody retrieval system with thresholds determined by using distribution of pitch and span of notes extracted from a music database whereby an accurate song's title can be obtained quickly.

Another object of this invention is to provide a World Wide Web-based melody retrieval system with thresholds determined by using distribution of pitch and span of notes from a music database whereby approximate relative-value sequences of pitch and span with the maximum quantity of information can be obtained dynamically from a music database and a user's input melody.

Another object of this invention is to provide a World Wide Web-based melody retrieval system which can convert relative-pitch or relative-span information of notes into approximate relative-values by categorization whereby the approximate values of each category appear with equal frequency in a database.

Another object of this invention is to provide a World Wide Web-based melody retrieval system which can determine arbitrary number of categories for converting relative-pitch or relative-span information of notes into approximate relative-values.

Another object of this invention is to provide a World Wide Web-based melody retrieval system using the coarse-to-fine matching whereby the number of answer candidates can be reduced by considering the trade-off between coarse matching and fine matching.

Another object of this invention is to provide a World Wide Web-based melody retrieval system which utilizes a sung melody as a query and is reliable so that it is robust enough to deal with anonymous users' inputs.

Another object of this invention is to provide a World Wide Web-based melody retrieval device which can be mounted either in a desired position or article whereby a melody retrieval can be carried out easily from the remotely located music databases over World Wide Web network.

Another object of this invention is to provide a World Wide Web-based melody retrieval device which can be set in a car whereby a car driver can retrieve music by singing, thus enabling the car driver to keep safe driving since there is no need for him to use his hands for retrieving or selecting music.

Another object of this invention is to provide a World Wide Web-based melody retrieval device which can be set in a karaoke player whereby a user can retrieve songs by singing.

Another object of this invention is to provide a World Wide Web-based melody retrieval device which can be set in a record shop whereby a user can retrieve music by singing over the network even if the record shop does not have the user's desired music CDs.

Another object of this invention is to provide a World Wide Web-based melody retrieval device which can be set in either a celluar phone or a portable device whereby a user can retrieve music anywhere.

Another object of this invention is to provide a World Wide Web-based melody retrieval device on which a plurality of users can input their desired melodies by singing at the same time.

Another object of this invention is to provide a device for retrieving the song's title from a music database over a World Wide Web network whereby the matching accuracy of a music retrieval is high enough for melody retrieval services over a World Wide Web network.

Still another object of this invention is to provide a media retrieval system which can retrieve media with music by melody.

DETAILED DESCRIPTION OF A PREFERRED EMBODIMENT

Figure 3:
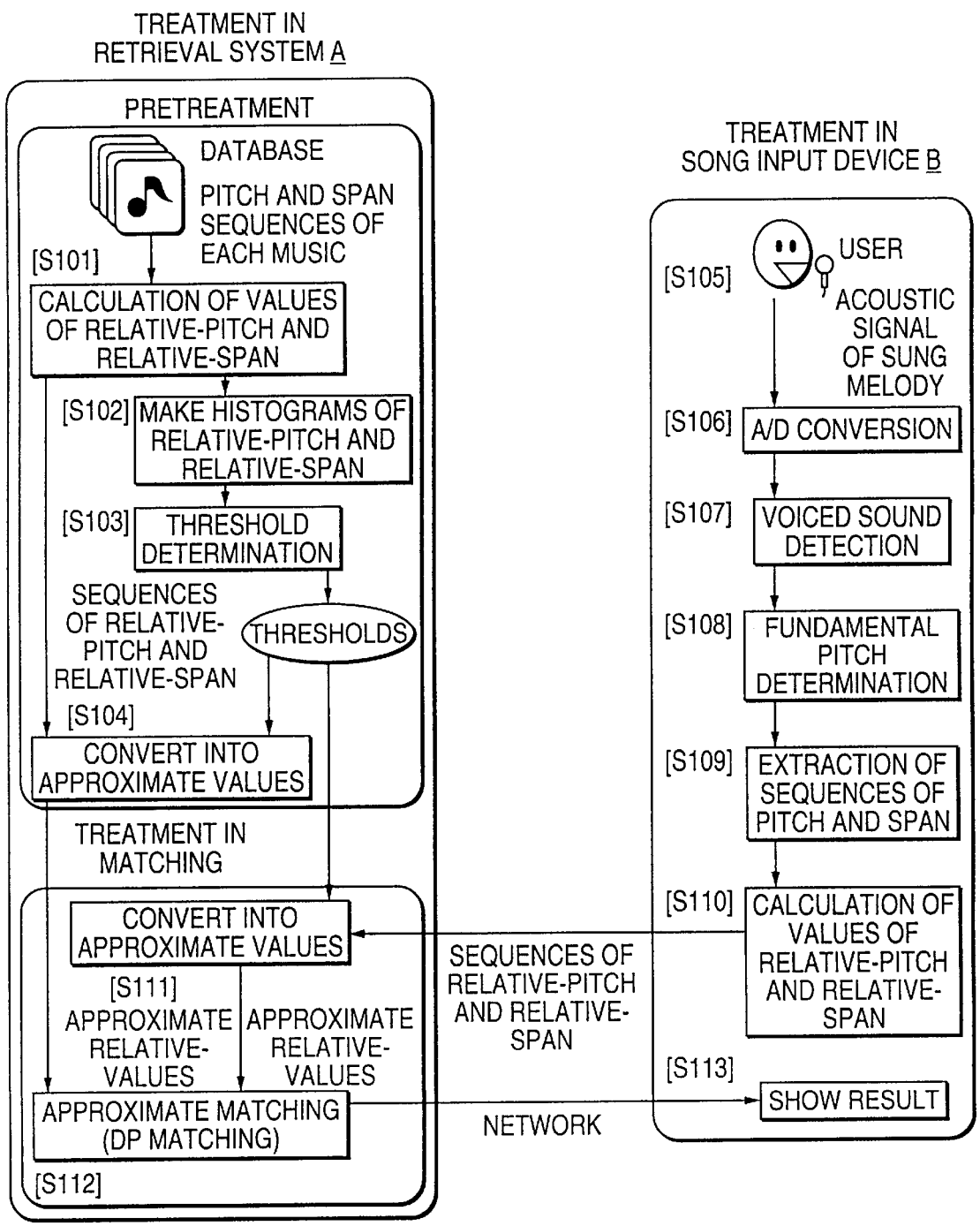
FIG. 3 is a flow chart illustrating the melody retrieval system of this invention.

Referring now to the accompanying drawings in which like numerals designate like parts throughout the several views thereof, there is shown in FIG. 3, a first embodiment of a melody retrieval system of this invention.

In preparing for retrieval, sequences of relative-pitch difference and relative-span ratio are obtained from sequences of pitch and span values of each musical composition in a database (S101), and a histogram of the relative-pitch values and a histogram of the relative-span values of the database are made by using the distribution of all notes in the database (S102).

Figure 1:
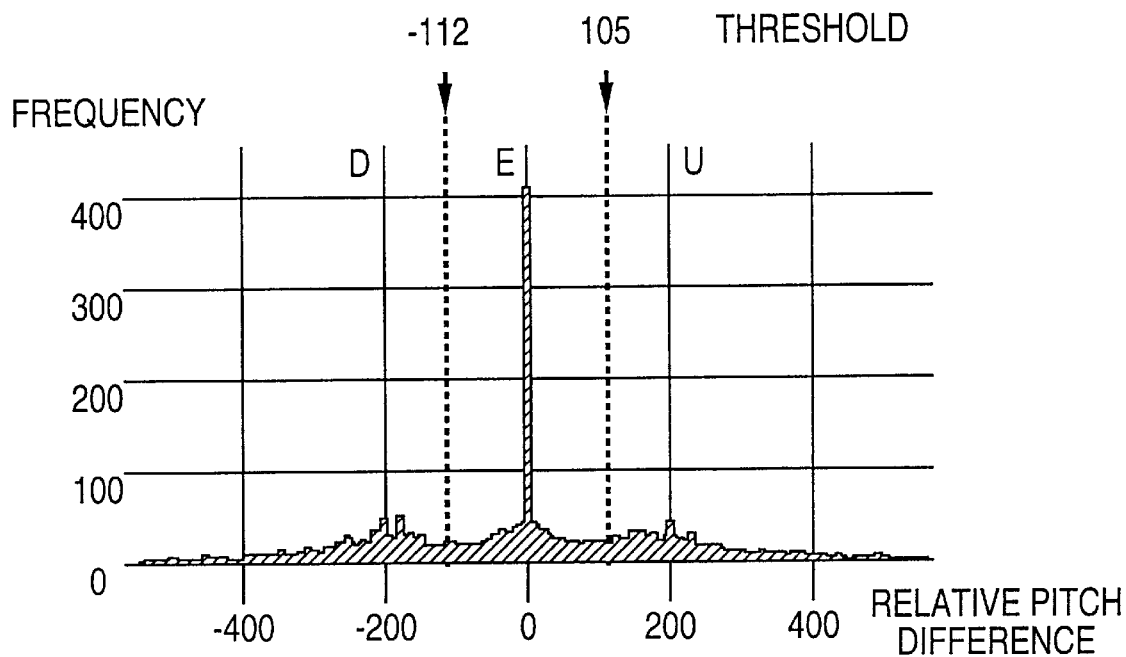
FIG. 1 is a histogram of the relative-pitch values of a melody retrieval system with thresholds determined by using distribution of relative-pitch values of notes extracted from a database of this invention, wherein the distributed three categories of U(p), E(qual) and D(own) for pitch determining the thresholds are illustrated.

In FIG. 1, the relative-pitch value is the normalized pitch difference between the adjacent notes in which a semitone difference is normalized to the value of 100.

Figure 2:
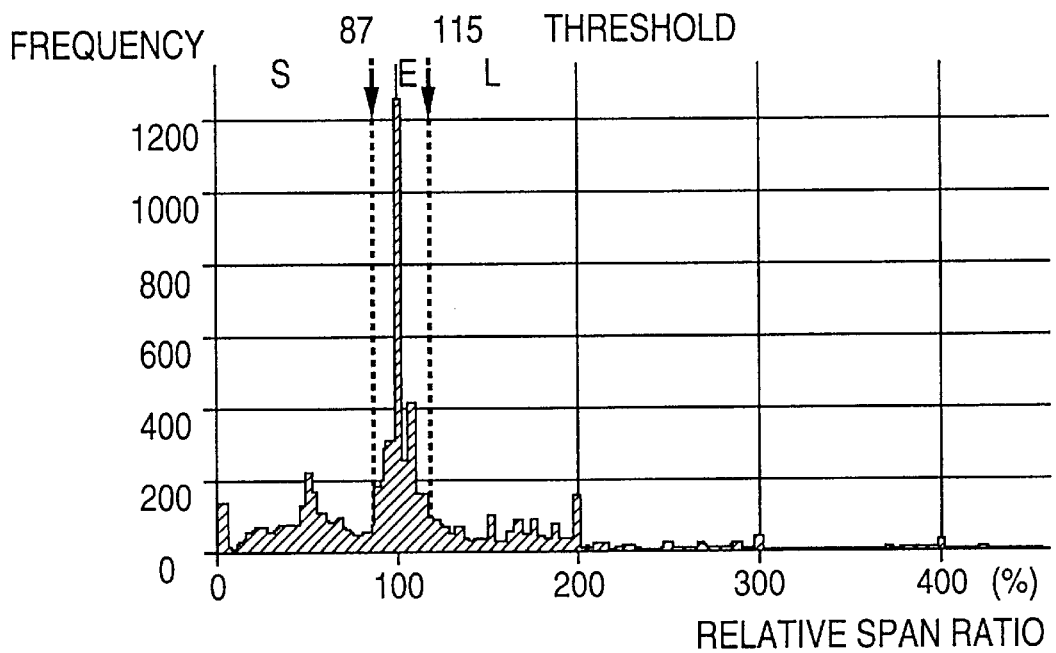
FIG. 2 is a histogram of the relative-span values of the melody retrieval system with thresholds determined by using distribution of relative-span values of notes extracted from a database of this invention, wherein the distributed three categories of L(onger), E(qual) and S(horter) for span determining the thresholds are illustrated.

In FIG. 2, the relative-span value is expressed by percentage.

In making these histograms, the total frequency of values of a histogram of pitch is expressed by Sum1, that of a histogram of span is expressed by Sum2 respectively, the number of categories in the histogram of relative-pitch values is expressed by Category_Num1, and the number of categories of relative-span values is expressed by Category_Num2 respectively.

In this case, thresholds for relative-pitch values are determined so that each category, which will be divided, (i.e., defined) by the thresholds, equally has M1(=Sum1/Category_Num1) values in it, and thresholds for relative-span values are similarly determined so that each category equally has M2(=Sum2/Category_Num2) values in it (S103), and subsequently the relative-pitch difference and relative-span ratio are respectively converted into the approximately relative-pitch values and approximate relative-span values by categorizing those values in several parts like U, E, D in FIG. 1 or S, E, L in FIG. 2 which are separated by the thresholds previously calculated (S104), The number of categories is 3 in each of FIGS. 1 and 2.

A song is inputted by singing, humming or whistling into a microphone 10 as preparation for retrieval (S105), subjected to an A/D conversion (S106), and the A/D converted signal is written into a memory 16, through which the AD converted signal is processed by a processor 14 in accordance with a program of the memory 16 to detect a voiced sound from the A/D conversion signal (S107), and a fundamental frequency of each frame is defined from the detected voiced sound (S108).

An onset time of the voiced sound is divided off as an onset time of each note, a time difference (number of frame) with an onset time of the next note is determined as the span of the note, and the maximum value among the fundamental frequencies of each note contained during its span is defined as the highest pitch values (S109).

Calculated from the obtained pitch and span from the previous sound are the relative pitch and span values (S110), which are transmitted to a song retrieval system A over the World Wide Web network.

Figure 4:
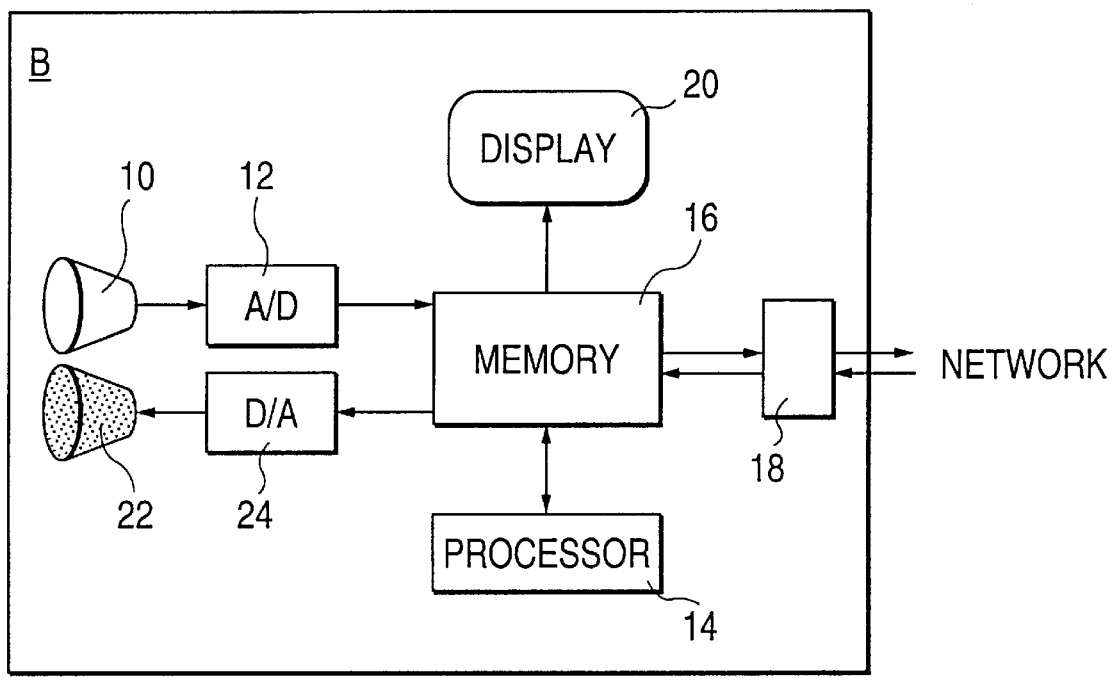
FIG. 4 is a melody retrieval terminal device combined with the melody retrieval system of this invention.

As shown in FIGS. 3 and 4, the relative pitch and span information of the user's input melody are respectively converted into approximate relative-pitch values and approximate relative-span values by using the same thresholds of (S104) and categorizing relative-pitch values or relative-span values in several parts like U, E, D in FIG. 1 or FIG. 2 (S111), which is compared with the coarse value of each melody in the music database, a distance between the pitch and span of each melody in the music database and the input key is calculated (S112), and the titles of music, which are sorted by the order of short distance previously calculated, are shown on a display 20 of an input device B (S113).

As particularly shown in FIG. 4, the input device B comprises a microphone 10, an A/D converter 12, a processor 14, a memory 16, an input and output unit 18, a display 20, a speaker 22 and a D/A converter 24.

It can be understood from FIG. 4 that the input and output unit 18 is connected to a World Wide Web network (not shown).

Received from the song retrieval system A is the retrieved result, which is shown in the display 20, and the desired melody among the retrieved songs can be heard from the speaker 22.

As described in the foregoing paragraphs, according to this invention, the title of the desired song can be easily and accurately retrieved by inputting the melody by singing into the microphone 10.

There is no need to construct histograms in obtaining relative-pitch difference and relative-span ratio of user's input melody. The calculation for this is very simple. The sequences of pitch and span of notes in the input melody have been obtained before this step, and each relative-values of pitch or span of note is obtained by calculating the difference or ratio from the adjacent previous note.

What is claimed is:

1. A World Wide Web-based melody retrieval method, comprising:

obtaining sequences of relative-pitch difference and relative-span ratio from sequences of pitch and span values of each musical composition in a database;

making a single histogram of the relative-pitch values of the database based on the distribution of all notes in the database;

making a single histogram of the relative-span values of the database based on the distribution of all notes in the database;

determining thresholds for relative-pitch so that each category, which will be defined by the thresholds, equally includes M1(=Sum1/Category_Num1) values, wherein M1 is the number of frequency of relative-pitch values which each category will contain, Sum1 is the total frequency of values of a histogram of relative-pitch, and Category_Num1 is the number of categories for relative-pitch values, and simultaneously determining thresholds for relative-span values so that each category equally includes M2(Sum2/Category_Num2) values, wherein M2 is the number of frequency of relative-span values which each category will contain, Sum2 is the total frequency of values of a histogram of relative-span, and Category_Num2 is the number of categories;

converting the relative-pitch values and the relative-span values into coarse pitch values, which are approximate relative-values of pitch, and coarse span values, which are approximate relative-values of span, respectively, according to the previously obtained thresholds;

inputting a song by singing, humming, or whistling a melody into a microphone;

subjecting the inputted melody to an A/D conversion so as to produce a digital signal;

detecting a voiced sound from a sound signal in the digital signal produced by the A/D conversion;

defining a fundamental frequency of each frame from the detected voiced sound;

dividing off an onset time of the voiced sound as an onset time of each note;

determining a time difference in units of frame number as the span value of the note;

determining the maximum value among the fundamental frequencies of each note contained during the span of said each note as the highest pitch value;

calculating the relative pitch and span values of each note by using the determined highest pitch value and the determined span value of the note preceding the note for which the relative pitch and span values are being calculated;

transmitting the calculated relative pitch and relative span values to a melody retrieval system over the World Wide Web network;

converting the relative pitch values and the relative span values of the inputted melody into coarse pitch values and coarse span values, respectively, by using the previously obtained thresholds;

comparing the coarse pitch values and coarse span values of the inputted melody with the coarse pitch values and coarse span values, respectively, of each melody in the music database;

calculating a distance between the pitch and span of each melody in the music database and the inputted melody; and displaying information indicative of musical compositions matching the inputted melody on a display of an input device.

2. A World Wide Web-based media retrieval method as claimed in claim 1, further comprising retrieving a media with music by melody.

3. A World Wide Web-based melody retrieval system, comprising:

means for obtaining sequences of relative-pitch difference and relative-span ratio from sequences of pitch and span values of each musical composition in a database;

means for making a single histogram of the relative-pitch values of the database based on the distribution of all notes in the database;

means for making a single histogram of the relative-span values of the database based on the distribution of all notes in the database;

means for determining thresholds for relative-pitch so that each category, which will be defined by the thresholds, equally includes M1(=Sum1/Category_Num1) values, wherein M1 is the number of frequency of relative-pitch values which each category will contain, Sum1 is the total frequency of values of a histogram of relative-pitch, and Category_Num1 is the number of categories for relative-pitch values, and simultaneously determining thresholds for relative-span values so that each category equally includes M2(=Sum2/Category_Num2) values, wherein M2 is the number of frequency of relative-span values which each category will contain, Sum2 is the total frequency of values of a histogram of relative-span, and Category_Num2 is the number of categories;

means for converting the relative-pitch values and the relative-span values into coarse pitch values, which are approximate relative-values of pitch, and coarse span values, which are approximate relative-values of span, respectively, by using the previously obtained thresholds;

means for inputting a song by singing, humming, or whistling a melody into a microphone;

means for subjecting the inputted melody to an A/D conversion so as to produce a digital signal;

means for detecting a voiced sound from a sound signal in the digital signal produced by the A/D conversion;

means for defining a fundamental frequency of each frame from the detected voiced sound;

means for dividing off an onset time of the voiced sound as an onset time of each note;

means for determining a time difference in units of frame number as the span value of the note;

means for determining the maximum value among the fundamental frequencies of each note contained during the span of said each note as the highest pitch value;

means for calculating the relative pitch and span values of each note by using the determined highest pitch value and the determined span value of the note preceding the note for which the relative pitch and span values are being calculated;

means for transmitting the calculated relative pitch and relative span values to a song retrieval system over the World Wide Web network;

means for converting the relative pitch values and the relative span values of the inputted melody into coarse pitch values and coarse span values, respectively, according to the previously obtained thresholds;

means for comparing the coarse pitch values and coarse span values of the inputted melody with the coarse pitch values and coarse span values, respectively, of each melody in the music database;

means for calculating a distance between the pitch and span of each melody in the music database and the inputted melody; and means for display information indicative of musical compositions matching the inputted melody on a display of an input device.

4. A World Wide Web-based media retrieval system as claimed in claim 3, further comprising means for retrieving a media with music by melody.

* * * * *